United States Patent [19]

Horn et al.

[11] Patent Number: 5,065,249
[45] Date of Patent: Nov. 12, 1991

[54] PORTABLE VIDEO CAMERA/MONITOR SUPPORT

[75] Inventors: Donald N. Horn, Cold Spring Harbor; Bern Levy, Northport, both of N.Y.

[73] Assignee: Vicon Industries, Inc., Melville, N.Y.

[21] Appl. No.: 249,609

[22] Filed: Sep. 26, 1988

[51] Int. Cl.⁵ .............................................. H04N 5/30
[52] U.S. Cl. .................................... 358/229; 358/87; 358/335
[58] Field of Search ............... 352/243, 293; 248/168, 248/187, 188.6; 354/81, 82; 358/229, 224, 199, 335, 906, 87, 288, 248

[56] References Cited

U.S. PATENT DOCUMENTS

| | | | |
|---|---|---|---|
| 759,114 | 5/1904 | Kronne | 354/81 |
| 2,806,416 | 9/1957 | Jones, Jr. | 352/243 |
| 4,083,480 | 4/1978 | Lee et al. | 352/243 |
| 4,153,917 | 5/1979 | Catano et al. | 358/87 |
| 4,672,436 | 6/1987 | Hawthorne | 354/82 |
| 4,835,621 | 5/1989 | Black | 358/906 |
| 4,849,778 | 7/1989 | Samuelson | 354/84 |

Primary Examiner—Donald McElheny, Jr.
Attorney, Agent, or Firm—Darby & Darby

[57] ABSTRACT

A portable support boom for supporting both a video camera and a video monitor includes a foldable boom having the video camera fixed to a remote portion of the boom and the video monitor mounted to an accessible portion of the boom. The support boom is held upright and directed by a cameraman in such a manner that the he may directly view images displayed by the monitor and recorded by the remote camera.

13 Claims, 3 Drawing Sheets

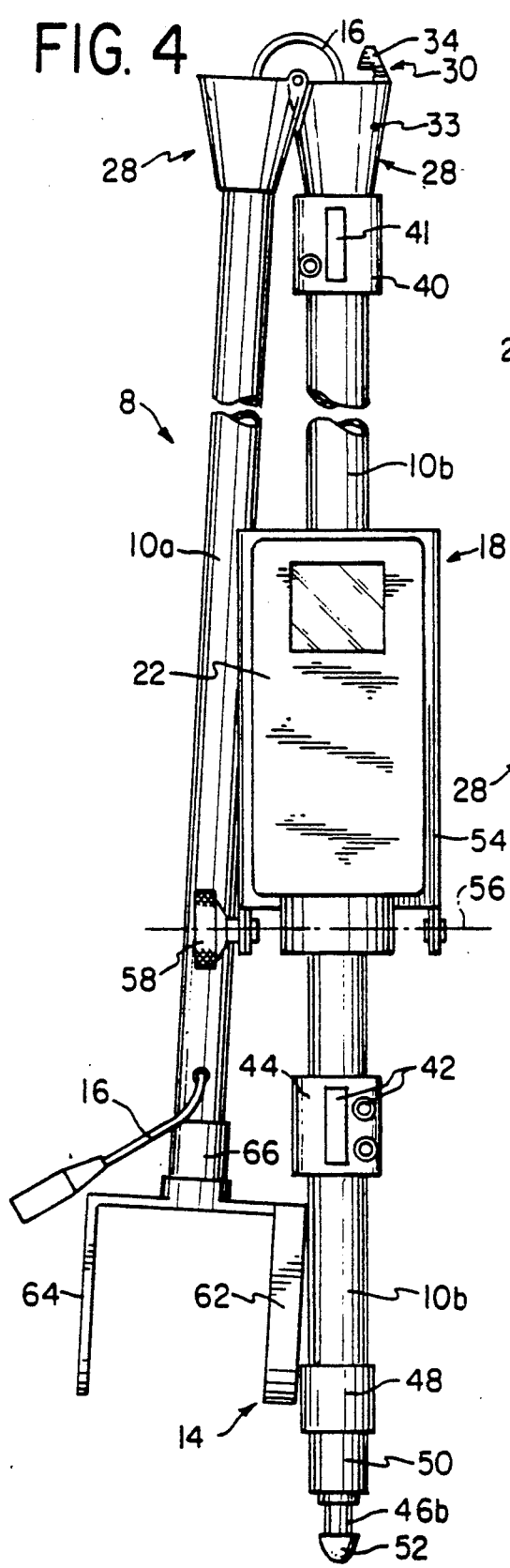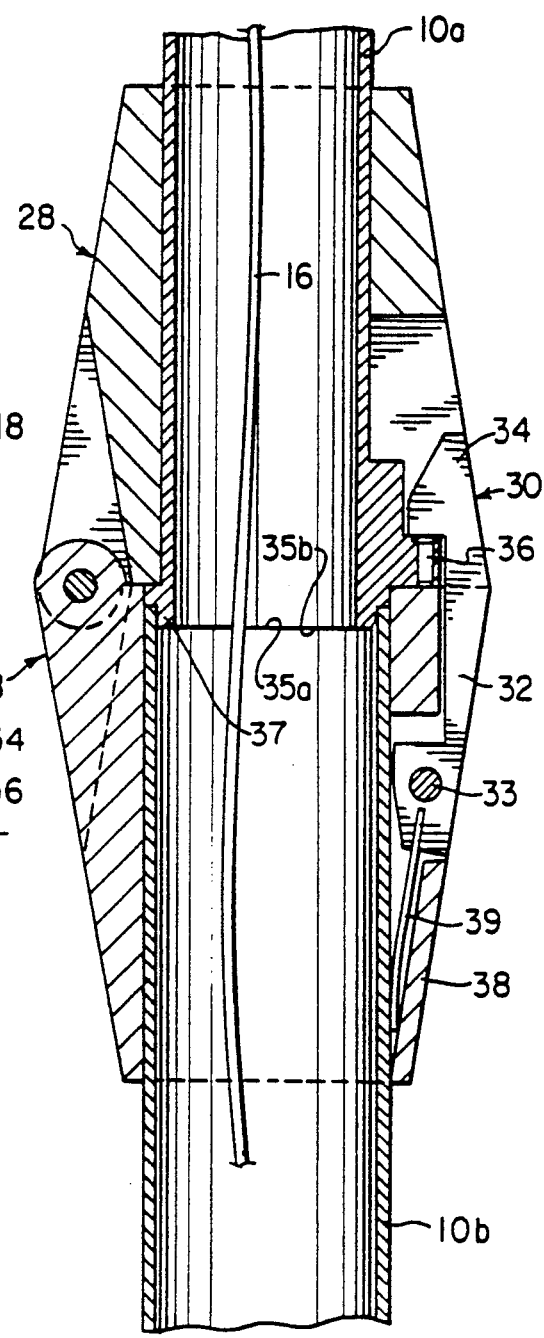

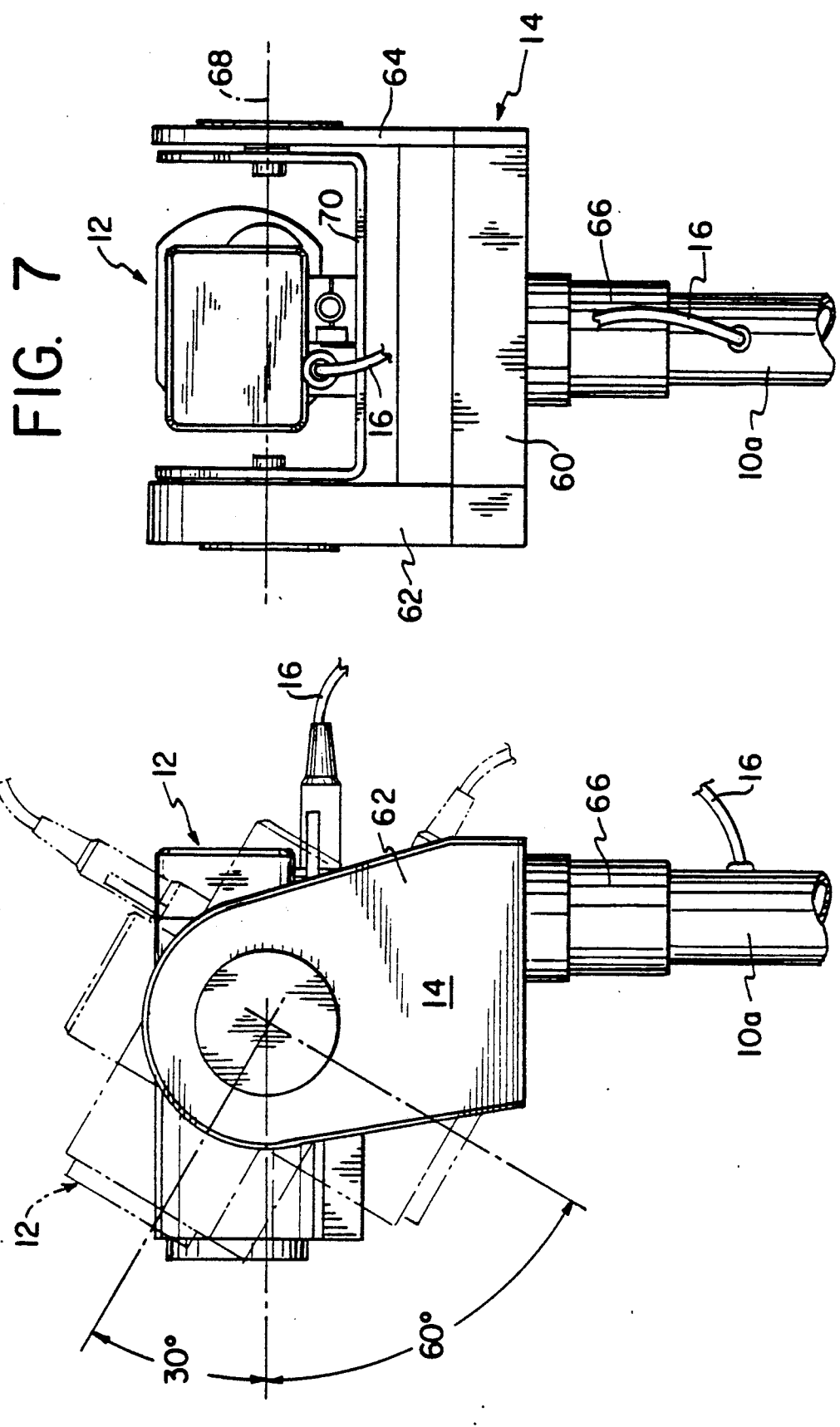

PORTABLE VIDEO CAMERA/MONITOR SUPPORT

This invention relates to video camera and monitor systems and, more specifically, to hand held extendable camera mounts for such systems.

The conventional mobile video camera systems used by T.V. broadcasting crews commonly involve a video camera with a built-in viewing monitor, a battery pack and a video cassette recorder (VCR), usually combined to form a portable unit called a porta-pak. The porta-pak allows one cameraman to operate the visual and audio recording of a particular event. On location, the amount of room available for the cameraman to maneuver is usually limited owing to crowds of people including other news media crews struggling to view the same event. Sometimes the event is immediately inaccessable or too dangerous to view closely or directly such as a gun-fight around the corner of a building, but usually the cameraman's main problem is the object or person blocking the camera's view of the event. The cameraman is further burdened by the heavy camera resting on his shoulder or shoulder brace and extending out, perpendicular from his face. The fact that his eye sight is concentrated through the narrow field view finder of the camera makes his movements through a crowd even more difficult.

A few devices have been developed which attempt to solve this viewing problem associated with maneuvering the camera close to an event and/or providing it with a clear view without placing the cameraman in danger. One such device is essentially a camera mounted at the end of a pole. The pole is hand held and maneuvered by one of the crew. It can be held above the surrounding crowds and other potential obstacles thereby ensuring a clearer view of the event without the cameraman having to approach the object or the event himself. Wires drape down from the camera and feed the visual information to both the VCR and the viewing monitor. The VCR in this case would be operated by another crew member to allow the cameraman (pole holder) more maneuverability through a crowd. The separate viewing monitor takes the place of the inaccessible built-in electronic view finder of the camera.

Although this extension device permits a camera to be moved close to the object of an event while allowing the cameraman to remain a safe or more comfortable distance away, the camera is of a simple featureless type to save on weight, leaving out such beneficial controls as a zoom lens feature and camera tilt (with respect to the pole). The cameraman must therefore move the pole to tilt the camera, for example, or move the camera in closer to the object in place of a zoom lens. These pole movements follow arcing paths causing accentuated and awkward camera movements which in turn create distorted rough recordings of an event which appear "jumpy" to the viewer. Furthermore, the more movements of the pole by the cameraman, the better his chances of hitting something, including other camera supporting poles in use, or interfering with the view of other camera crews.

Also, since the monitor remains a separate device, the cameraman must be told where to move the camera by the monitor operator. The monitor and its operator are usually positioned apart from the cameraman making it difficult for the cameraman to view the monitor itself or communicate with the monitor operator. Therefore, the cameraman can no longer directly control the focus and image intensity of a recording and can not easily determine what he is recording. Similarly, the cameraman should also be able to communicate with the VCR operator so he knows exactly when the recorder is recording. The use of such a camera extension pole makes each crew member dependent on the actions of the other. This in turn, makes the recording process of a quick news event difficult and inefficient.

It is an object of the present invention to provide an extendable, mobile, hand held video/monitor support system that overcomes the aforementioned problems.

It is another object of the present invention to provide an extendable, mobile, hand held video/monitor support system which can be fully controlled and monitored by a single operator.

It is a further object of the present invention to provide an extendable, mobile, hand held video/monitor support system which includes a viewing monitor at one end and a video camera at a remote end such that a cameraman can monitor and fully control the field of view of the remote camera.

It is yet a further object of the present invention to provide an extendable, mobile, hand held video/monitor support system which includes an extendable camera mount which can be collapsed into a compact unit for storage.

It is yet a further object of the present invention to provide an extendable, mobile, hand held video/monitor support system which incorporates a harness for assisting the operator and a monopod for optional ground support.

SUMMARY OF THE INVENTION

There is provided a portable device for supporting camera equipment, comprising a rigid elongated member, a video camera attached to said elongated member such that said camera is remote from an operator, and a video monitor attached to said elongated member, said monitor positioned for viewing by said operator.

BRIEF DESCRIPTION OF THE DRAWINGS

FIG. 4 is an overall top view of one embodiment of the present invention showing the support pole in the folded position (figure does not include a camera);

FIG. 5 is a cross sectioned side view of one embodiment of the present showing an elbow joint and its locking mechanism;

FIG. 6 is a side view of the camera mount assembly of the present invention showing details of a mounted camera; and FIG. 7 is a rear view of the camera mount assembly of the present invention.

DETAILED DESCRIPTION OF THE PREFERRED EMBODIMENT

Figure 1:
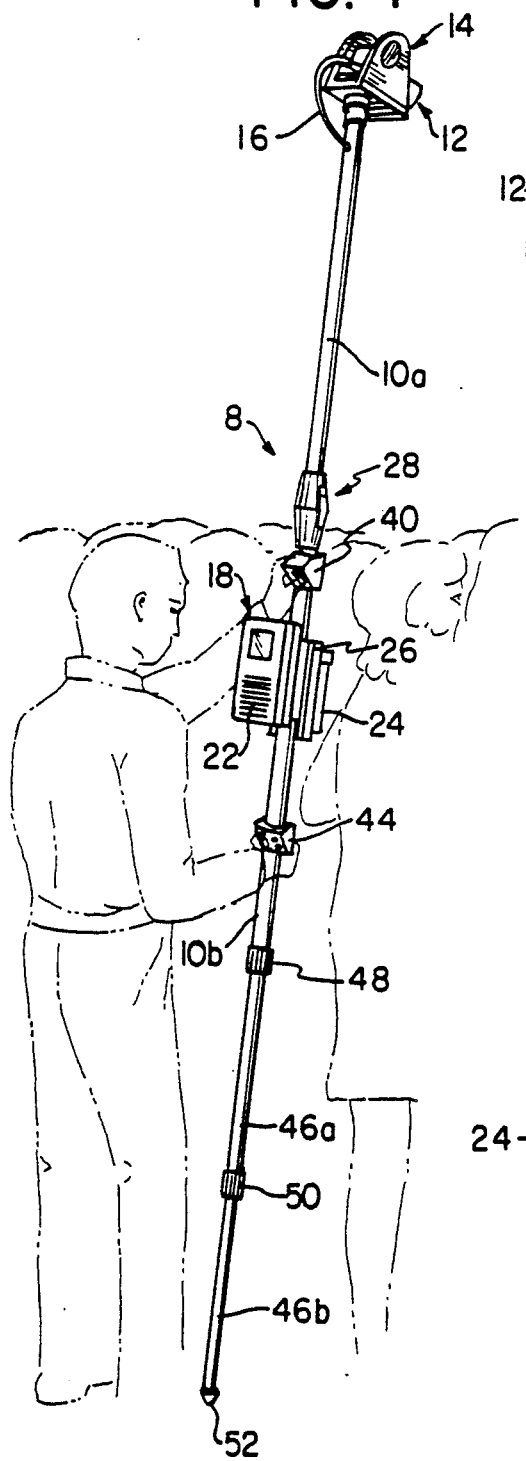
FIG. 1 is a conceptual view showing one embodiment of the present invention in use in a crowd of people.
Figure 2:
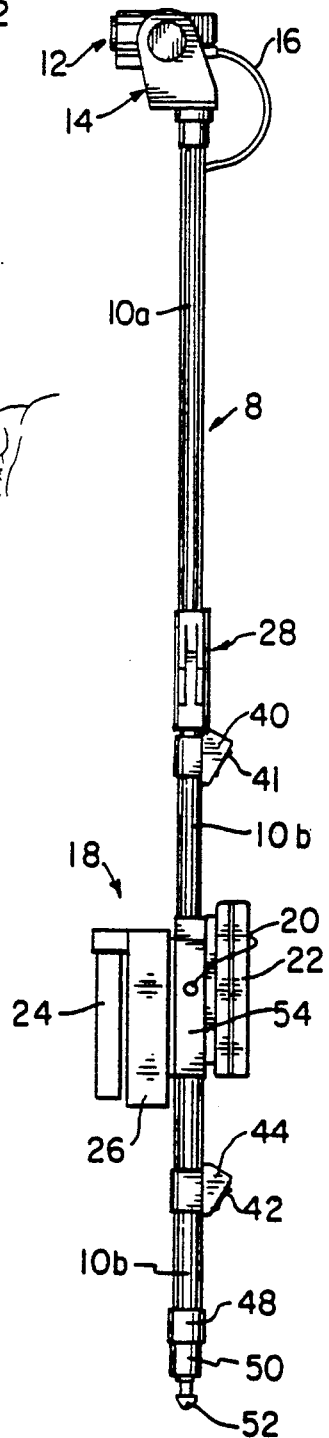
FIG. 2 is an overall side view of one embodiment of the present invention showing a support pole in the straight and unfolded position.

Referring to FIG. 1, an extended hand held camera/monitor support shaft 10 is shown according to one embodiment of the present invention. The shaft 10 is held upright from the ground and operated by the operator shown. The shaft 10 is locked in its extended position and selectively collapsible as further described below. The shaft 10 is made up of two sections, an upper shaft section 10a and a lower shaft section 10b, both preferably made from a light weight and rigid material such as aluminum. The shaft is preferably a straight tube, but may also be curved (and perhaps solid) according to its particular use.

A camera 12 is mounted at the top end of the upper shaft section 10a and is preferably compact and lightweight. The camera 12 includes only the light sensitive target plate (not shown) and minor operating circuitry to save on room and weight. The remaining circuitry of the camera 12 is located remote from the camera, as described below. The camera 12 is attached to the upper shaft section 10a by way of a camera mounting assembly 14. The camera mounting assembly 14 is rigidly attached to the upper shaft section 10a and allows the camera 12 to tilt and in another embodiment of this invention, pan. The camera mounting assembly 14 also houses and protects various camera drive motors used to operate the different camera movements and controls including tilt, pan (when used), lens focus and light intensity control (f-stop). These operating features of the camera 12 are known and, therefore, are not shown in detail in the drawings. The operating features of the camera 12 are controlled via operating cables 16 which, in the preferred embodiment, are attached along the outside of the shaft but in other embodiments could be located within the shaft 10 to prevent damage.

Down the shaft 10 from the camera mount assembly 14 is a monitor mount assembly 18 which is slidably positioned around the shaft 10 and can be locked via a set screw 20 anywhere along its slidable range. A cylindrically shaped hole (not shown) is provided through the monitor mount assembly 18 for accepting the shaft 10. The monitor mount assembly 18 supports a monitor 22; circuitry for the camera drive motors, the camera 12 and various other operating features (described below); and a battery pack 24. The circuitry (not shown) is protected within a housing 26 which is attached to the monitor mount assembly. The battery pack 24 lies adjacent to the housing 26 and provides all the necessary power requirements for all the electrical devices used directly with the video/-monitor system and does not in the preferred embodiment supply power to the separate VCR or other detached equipment, but could in other embodiments. The battery pack 24 could also be incorporated within the housing 26.

The two sections of the shaft 10, upper 10a and lower 10b are hingably attached at a common elbow joint 28 which permits the shaft sections 10a, 10b and the entire camera/-monitor mount assembly 8 to be folded, approximately in half. This allows the entire assembly 8 to be collapsed to a compact form, as shown in FIG. 4, for storage and carrying when not in use. In other embodiments, several elbow joints similar to the one shown in FIG. 5 could be positioned at various locations along the shaft 10 to provide an even more compact assembly 8.

A lock mechanism 30 is provided at the elbow joint 28 to create a rigid connection between the unfolded and straight two shaft sections 10a and 10b. The preferred lock mechanism is shown in FIG. 5 and includes a spring bias latch member 32 operating around pivot point 33. The latch member 32 is positioned parallel along one shaft section, opposite the elbow joint 28 such that its latching element 34 extends past the edge 35a of the shaft section and is spring bias inwardly toward the center of the shaft 10. The other attached shaft section has a locking ear 36 lying opposite the elbow joint 28 along its edge 35b. The locking ear 36 is positioned in relation to the latching element 34 of lock member 32 such that when the two shaft sections 10a and 10b are unfolded about the elbow joint 28 to become the straight shaft 10, the latching element 34 of one shaft section engages the locking ear 36 of the other shaft section and creates the rigid shaft 10. A step shaped ring 37 helps provide the rigidity of the straight shaft 10.

Figure 3:
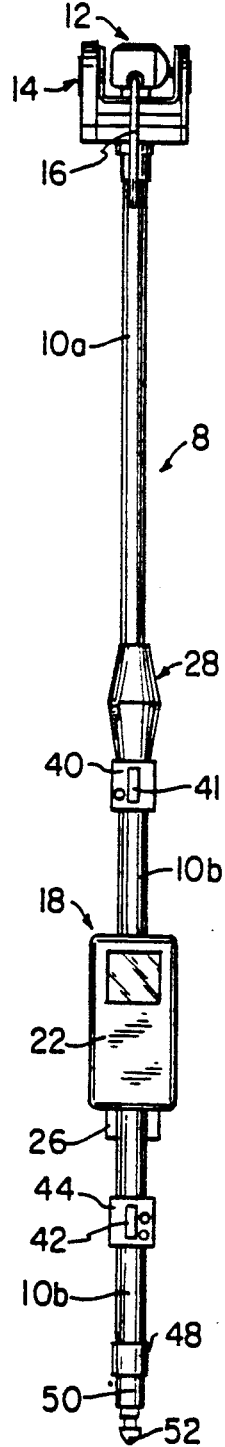
FIG. 3 is an overall top view of the embodiment of FIG. 2 showing the support pole in the straight and unfolded position.

The shaft section 10a and 10b can be selectively folded to resemble the assembly shown in FIG. 3. This is accomplished by disengaging the latch element 34 from the locking ear 36 and folding the shaft sections 10a, 10b about the elbow joint 28. A disengaging member 38, when depressed swings latch member 32 about pivot 33 outwardly from the center of the ploe 10 and against the action of a biasing spring 39 and disengages the latching element 34 from the locking ear 36. A separate latch (not shown) can be used to secure the shaft sections in the folded position.

An upper control assembly 40 is located preferably around the lower shaft section 10b, below the elbow joint 28 and above the monitor mounting assembly 18. The upper control assembly 40 is located at a convenient hand grip location. The control assembly 40 preferably houses control switches 41 for controlling focus and zoom features of the camera 12, but in other embodiments could control any other feature used with such devices such as activating the VCR or camera tilt. These electrical control switches 41 are conveniently placed where the on the hand grip so that the operator can control electrical functions while holding and/or maneuvering the camera/-monitor mount assembly 8 through the crowd. Additional electrical control switches 42 are preferably found incorporated with a lower control assembly 44 found preferably below the monitor mounting assembly 18 around the lower shaft section 10b. The second control assembly 44 is located at a convenient hand grip location for holding and maneuvering the camera/-monitor mounting assembly 8. In other embodiments of the invention where the operator does not have to hold the camera/monitor mounting assembly 8, the control switches 41, 42 can be located at any convenient place such as the housing 26 or on the monitor itself. Like the monitor mount assembly 18, the control assemblies 40, 44 are slidably adjustable along the shaft 10, being locked in place by any conventional means, preferably a conventional set screw method (not shown in detail).

Other electrical circuits provide outputs to remote recording devices, such as a VCR and also an electrical jack for providing remote controlled capabilities. The camera/-monitor assembly could be mounted to a stationary tripod arrangement and be controlled at some remote location. The monitor 22 in such case, can be removed leaving camera 12 for viewing a scene. Furthermore, the pan feature could be incorporated with this arrangement so that the camera 12 could be fully operational from a remote distance. A crew member could connect a viewing monitor into the remote camera assembly and watch the controlling views or take over the control of the camera. Also, a tally light could be implemented onto the top portion of the monitor (or anywhere on the camera 12 or shaft 10) for informing both the cameraman and the subject being recorded when the recorder (VCR) is actually recording.

FIG. 1 shows the camera/monitor mount assembly 8 being supported on the ground. This is accomplished by a series of telescoping monopod segments 46a and 46b. These segments 46a–b, when not required are housed inside the hollow lower shaft section 10b. The two segments 46a–b are preferably made from a lightweight and rigid material such as aluminum or plastic. The monopod segments 46a–b are spring biased (a spring is located in the shaft 10-not shown) to the extended position from within the shaft 10 and when activated will form a telescoping arrangement which increases the overall shaft length for ground support. Locking sleeves 48 and 50 incorporating set screws (not shown) provide the preferred means of tightening the individual monopod segments 46a–b. The number and individual length of each segment can be changed depending on the total shaft length desired and the amount of linear room available inside the lower shaft section 10b. A rubber contact cup 52 is preferably located at the very lowest point of the lowest monopod segment which contacts the surface of the ground and provides a friction grip during slippery ground conditions (such as wet ground).

In the preferred embodiment, the monitor 22 is mounted onto an adjustable mounting plate 54. The mounting plate, in turn is secured to the monitor mounting assembly 18 along an axis 56. The mounting plate 54 and the mounted monitor 22 are tiltable about the axis 56 such that a comfortable viewing angle of the monitor can be obtained by the cameraman, avoiding glare problems of the monitor screen with sunlight. To fix the monitor 22 at a specific viewing angle, knob 58, located at axis 56 is tightened. This is best shown in FIG. 4.

The camera mount assembly 14 and a mounted camera 12 is shown in FIGS. 6 and 7. The mount 14 is preferably lightweight and rigid such as aluminum and is "U" shaped, as shown in FIG. 7. The mount 14 is made up from three sections, a base 60, housing wall 62, and a support wall 64. The base 60 is connected to the uppermost portion of the shaft section 10a by a shaft bracket 66. The base 60 and the housing wall 62 are boxed portions and house some of the operating circuitry and camera control motors, specifically the motor used to tilt the camera with respect to the shaft 10. The support wall 62 lies vertical from the base 60 and parallel with the housing wall 64. The support wall 62 provides a support for the camera 22 along a tilting axis 68. In a preferred embodiment of the invention, a camera bracket 70 is used to secure the camera 22 within the camera mount 14 and along the tilting axis 68.

What is claimed is:

1. In combination;
    a rigid elongated member having a portion accessible to an operator and a remote location at an extremity;
    a video camera attached to said elongated member at said remote location; and
    a video monitor attached to said elongated member at said portion accessible to said operator, said monitor positioned for viewing by said operator.

2. The device according to claim 1 further comprising a hinge located along said elongated member about which said elongated member selectively folds for collapsing said elongated member and creating a compact version of said device for easy storage.

3. The device according to claim 2 wherein said hinge is selectably lockable in both the unfolded position where said elongated member is straight and the folded position where said elongated member is collapsible and made compact.

4. The device according to claim 1 further comprising electrical controls mounted along said elongated member for operating said camera and said monitor.

5. The device according to claim 4 further comprising gripping handles attached to said elongated member, wherein the position of said gripping handles are selectively adjustable along said elongated member.

6. The device according to claim 5 wherein said electrical controls are incorporated into said gripping handles.

7. The device according to claim 1 further comprising a selectably retractable extension for extending said elongated member to the ground for stability.

8. The device according to claim 1 further comprising a strap harness for attaching said elongated member to said operator for providing stability to said camera and said monitor.

9. The device according to claim 1 further comprising a camera mount assembly attached to one end of said elongated member which holds said camera such that said camera is selectively tiltable in relation to said elongated member.

10. The device according to claim 1 further comprising a monitor mount assembly slidably attached to said elongated member which holds said monitor, said monitor mount assembly allowing for selectively adjustable tilting movement of said monitor.

11. The device according to claim 1 further comprising a battery pack for powering said camera and said monitor.

12. The device according to claim 1 wherein only the light sensitive target plate section of said camera is mounted onto said elongated member, remote from said operator and the remaining electronics of said camera are located elsewhere of the device.

13. A portable support boom for supporting both a video camera and a video monitor, said boom being held upright and directed by a cameraman, said support boom comprising:
    a first portion which is accessible to said cameraman;
    a second portion which is located remote to said cameraman;
    means for mounting a video camera to said support boom within said second portion; and
    means for mounting a video monitor to said support boom within said first portion, wherein said camera selectively receives images at said remote location and said video monitor displays said images for viewing by the cameraman.

* * * * *